(12) United States Patent
Wolff

(10) Patent No.: US 12,061,175 B2
(45) Date of Patent: Aug. 13, 2024

(54) FASTENING ASSEMBLY FOR FASTENING A TEST DEVICE HOLDER TO A FORCE-MEASURING APPARATUS, FORCE-MEASURING APPARATUS HAVING A FASTENING ASSEMBLY OF THIS TYPE, TEST DEVICE HOLDER, AND SLIDE PART FOR A FORCE-MEASURING APPARATUS

(71) Applicant: Vetter Pharma-Fertigung GmbH & Co. KG, Ravensburg (DE)

(72) Inventor: Michael Wolff, Gestratz (DE)

(73) Assignee: Vetter Pharma-Fertigung GmbH & Co. KG, Ravensburg (DE)

( * ) Notice: Subject to any disclaimer, the term of this patent is extended or adjusted under 35 U.S.C. 154(b) by 484 days.

(21) Appl. No.: 17/312,284

(22) PCT Filed: Dec. 6, 2019

(86) PCT No.: PCT/EP2019/083940
§ 371 (c)(1),
(2) Date: Jun. 9, 2021

(87) PCT Pub. No.: WO2020/120303
PCT Pub. Date: Jun. 18, 2020

(65) Prior Publication Data
US 2022/0107248 A1    Apr. 7, 2022

(30) Foreign Application Priority Data
Dec. 10, 2018   (DE) ..................... 10 2018 221 336.4

(51) Int. Cl.
*G01N 3/04*   (2006.01)
*G01L 5/00*   (2006.01)
(Continued)

(52) U.S. Cl.
CPC .............. *G01N 3/04* (2013.01); *G01L 5/0028* (2013.01); *G01M 99/007* (2013.01); *G01N 3/08* (2013.01);
(Continued)

(58) Field of Classification Search
CPC .... G01N 3/04; G01N 3/08; G01N 2203/0405; G01N 2203/0476; G01L 5/0028; G01M 99/007
(Continued)

(56) References Cited

U.S. PATENT DOCUMENTS 2,645,259 A * 7/1953 Ackland ................. B27G 17/02
30/293
5,361,640 A * 11/1994 Carroll ..................... G01N 3/04
73/831
(Continued)

FOREIGN PATENT DOCUMENTS

DE        20106760 U1   4/2001
GB         2310502 A    8/1997
(Continued)

OTHER PUBLICATIONS

International Search Report and Written Opinion for PCT/EP2019/083940 dated Apr. 1, 2020, 12 pages. English translation of ISR only.
(Continued)

*Primary Examiner* — Nathaniel T Woodward
*Assistant Examiner* — Philip L Cotey
(74) *Attorney, Agent, or Firm* — Sheppard Mullin Richter & Hampton LLP

(57) ABSTRACT

The invention relates to a fastening assembly (3) for fastening a test device holder (5) to a force measuring apparatus (1), having a test device holder (5) and a slide part (7) which
(Continued)

can be or is arranged on a force measurement tower (9) of the force measuring apparatus (1) in such a way that the slide part can move in the vertical direction of the force measurement tower (9). The test device holder (5) has at least one position defining element (11), and the slide part (7) has at least one counter position defining element (13). The position defining element (11) and the counter position defining element (13) are designed to fix the position of the test device holder (5) relative to the slide part (7) in at least one direction, selected from the vertical direction of the force measurement tower (9) and a direction perpendicular to the vertical direction, and at the same time to allow rotation of the test device holder (5) relative to the slide part (7) about an axis of rotation (D) defined by the position defining element (11) and/or the counter position defining element (13). The test device holder (5) has a first angle adjustment device (15) and the slide part (7) has a second angle adjustment device (17), which are designed to adjust and preferably to fix the angle of the test device holder (5) relative to the slide part (7) about the axis of rotation (D). The test device holder (5) has at least one fixing element (19) and the slide part (7) has at least one counter fixing element (21). The fixing element (19) and the counter fixing element (21) are designed to fix the test device holder (5) on the slide part (7).

15 Claims, 3 Drawing Sheets

(51) Int. Cl.
*G01M 99/00* (2011.01)
*G01N 3/08* (2006.01)

(52) U.S. Cl.
CPC ............... *G01N 2203/0405* (2013.01); *G01N 2203/0476* (2013.01)

(58) Field of Classification Search
USPC .......................................................... 73/856
See application file for complete search history.

(56) References Cited

U.S. PATENT DOCUMENTS

| | | | | |
|---|---|---|---|---|
| 5,421,207 | A * | 6/1995 | Carroll | G01N 3/04 73/856 |
| 8,561,474 | B2 * | 10/2013 | Secq | G01N 3/10 73/826 |
| 2001/0020393 | A1 * | 9/2001 | Buck | G01N 3/38 73/849 |
| 2009/0171181 | A1 * | 7/2009 | Kumada | A61B 5/291 600/383 |
| 2012/0006236 | A1 * | 1/2012 | Benthien | B64C 1/406 108/50.11 |
| 2013/0042697 | A1 * | 2/2013 | Edelman | G01N 3/08 73/818 |
| 2014/0352451 | A1 * | 12/2014 | Kismarton | G01N 3/08 73/826 |
| 2015/0343148 | A1 * | 12/2015 | Marmey | A61B 5/150274 604/152 |
| 2015/0360300 | A1 * | 12/2015 | Hecht | B23B 51/00 408/231 |
| 2016/0175943 | A1 * | 6/2016 | Judas | B23B 29/205 82/158 |
| 2018/0044954 | A1 * | 2/2018 | Hambusch | B60R 21/38 |
| 2020/0016446 | A1 * | 1/2020 | Speckmaier | A63B 21/0557 |
| 2020/0352769 | A1 * | 11/2020 | Schilling | A61F 5/0123 |
| 2020/0406831 | A1 * | 12/2020 | Michel | F16B 5/0266 |
| 2021/0290458 | A1 * | 9/2021 | Gfoehler | A61G 5/027 |
| 2022/0107252 | A1 * | 4/2022 | Wolff | G01L 5/0038 |

FOREIGN PATENT DOCUMENTS

| | | |
|---|---|---|
| JP | 2003-194688 A | 7/2003 |
| JP | 2014-202619 A | 10/2014 |

OTHER PUBLICATIONS

Office Action dated Jul. 4, 2023 for Japanese Application No. 2021-532365. 12 pages.

* cited by examiner

FASTENING ASSEMBLY FOR FASTENING A TEST DEVICE HOLDER TO A FORCE-MEASURING APPARATUS, FORCE-MEASURING APPARATUS HAVING A FASTENING ASSEMBLY OF THIS TYPE, TEST DEVICE HOLDER, AND SLIDE PART FOR A FORCE-MEASURING APPARATUS

This application is a U.S. National Stage Application under 35 U.S.C. § 371 of International Application No. PCT/EP2019/083940, filed Dec. 6, 2019, which claims priority to DE 10 2018 221 336.4, filed Dec. 10, 2018, the contents of which are incorporated to the present disclosure by reference.

The invention relates to a fastening assembly for fastening a test device holder to a force measuring apparatus, to a force measuring apparatus having such a fastening assembly, to a test device holder, and to a slide part for a force measuring apparatus.

Force measuring apparatuses of the type discussed here are used in particular to carry out tensile and compression tests, in particular on medical hollow bodies. By means of such force measuring apparatuses, for example, a sliding force and/or tightness of a displaceable piston in a medical hollow body can be determined, in particular on the basis of the compressive force required to displace the piston. In particular, it is possible to verify whether a sufficient, or possibly excessive, amount of silicone or another lubricant has been applied. Furthermore, stability, assembly force, breaking force, torsional resistance and other properties, especially in the case of medical hollow bodies, can be tested. Such a force measuring apparatus typically has a test device holder for holding at least one test device, for example a pressure ram in combination with a load cell, as well as a slide part which is arranged on a force measuring tower of the force measuring apparatus so as to be displaceable in the vertical direction of the force measuring tower. The test device holder is attached to the slide part and can be displaced together with the slide part in the vertical direction of the force measuring tower. For force measurement, in particular tensile/compressive force measurement, the test device holder, with the at least one test device, is displaced on the slide relative to a sample holder and in particular a sample arranged on the sample holder along the vertical direction of the force measuring tower, or at least is loaded with a force in the direction of displacement—either in the direction of tension or compression. This force is recorded—in particular as a function of time. Information about the sample can then be obtained from a force profile over time and/or a force profile plotted over a travel path of the slide.

In order to obtain reproducible and relevant results, it is necessary that the sample on the one hand and the displacement path of the test device holder with the test device on the other hand, in particular the alignment of the test device holder along the vertical direction of the force measuring tower, are aligned exactly parallel to each other. In particular, there must be no angular offset between the longitudinal alignment of the test device and the vertical direction of the force measuring tower if the measurement results are to be meaningful.

There is therefore a need for a way of attaching the test device holder to the force measuring apparatus in a precisely defined and reproducible manner The invention is therefore based on the object of creating a fastening assembly for fastening a test device holder to a force measuring apparatus, a force measuring apparatus having such a fastening assembly, a test device holder for fastening to such a force measuring apparatus, and a slide part for such a force measuring apparatus, the disadvantages mentioned not occurring, and in particular a precise, stable and reproducible fastening of the test device holder to the force measuring apparatus being possible.

The object is achieved by creating the subject matter of the independent claims. Advantageous configurations are found in the dependent claims.

The object is achieved in particular by creating a fastening assembly for fastening a test device holder to a force measuring apparatus, which has a test device holder as well as a slide part which can be arranged—or is arranged—on a force measuring tower of a force measuring apparatus in the vertical direction of the force measuring tower, with the test device holder having at least one position defining element, and wherein the slide part has at least one counter position defining element. The position defining element and the counter position defining element are configured—and in particular coordinated with each other—to determine a position of the test device holder relative to the slide part in at least one direction, selected from a vertical direction of the force measuring tower and a direction perpendicular to the vertical direction, in particular a width direction, and at the same time to permit a rotation of the test device holder relative to the slide part about an axis of rotation defined by the position defining element and/or the counter position defining element. The test device holder also has a first angle adjustment device, and the slide part has a second angle adjustment device. The angle adjustment devices are configured—and in particular coordinated with each other—to adjust an angle of the test device holder relative to the slide part about the axis of rotation. The angle adjustment devices are preferably additionally set up—and preferably coordinated with each other—in order to fix the angle of the test device holder relative to the slide part about the axis of rotation. The test device holder also has at least one fixing element, and the slide part has at least one counter fixing element. The fixing element and counter fixing element are configured—and preferably coordinated with each other—in order to fix the test device holder on the slide part. By means of the position defining element and the counter position defining element, it is thus easily possible to fix the test device holder on the slide part and relative to the slide part at least in a linear direction, wherein an angular orientation of the test device holder relative to the slide part and thus preferably relative to the vertical direction of the force measuring tower is subsequently possible by rotating the test device holder about the axis of rotation. For this purpose, the angle adjustment devices are advantageously used, which can particularly preferably be used at the same time to set the angle. Finally, the position of the test device holder on the slide part can be fixed by means of the fixing element and the counter fixing element, so that it remains unchangeable—especially during use of the force measuring apparatus, preferably during a large number of successive uses of the force measuring apparatus. It is thus possible with the aid of the fastening assembly proposed here to align and fix the test device holder securely, stably and reproducibly on the force measuring apparatus.

The test device holder is configured in particular to arrange at least one test device on the test device holder. The test device holder is particularly preferably configured for the arrangement of three test devices on the test device holder. Such a test device preferably has a test element, in particular a ram, and also a load cell that is operatively connected to the test element. At least one test device is preferably arranged on the test device holder. Three test devices are particularly preferably arranged on the test device holder.

The slide part can preferably only be displaced in the vertical direction on the force measuring tower and is preferably connected in a fixed position to the force measuring tower in the other Cartesian directions which are perpendicular to the vertical direction. In this way, the slide part and thus at the same time the test device holder connected to the slide part can be displaced in a defined, precise and reproducible manner along the vertical direction of the force measuring tower, without superimposing further movements. The slide part can itself be designed as a slide of the force measuring tower, which is retained in such a manner that it can be displaced linearly in the vertical direction of the force measuring tower by means of a suitable displacement mechanism. The slide part can also be a slide attachment which is releasably fastened to a slide of the force measuring tower.

The position defining element and the counter position defining element are preferably configured—and in particular coordinated with each other—in order to determine the position of the test device holder relative to the slide part in both directions, namely in the vertical direction of the force measuring tower and in the direction perpendicular to the vertical direction, in particular the width direction. In this way, the test device holder can be arranged particularly precisely and stably on the slide part.

The axis of rotation defined by the position defining element and/or the counter position defining element is preferably aligned such that the test device holder rotates relative to the slide part about the axis of rotation in a plane in which the vertical direction of the force measuring tower lies, in particular in a plane in which both the vertical direction of the force measuring tower, and also the width direction perpendicular thereto, lie. The axis of rotation is therefore perpendicular to this plane. In particular, the axis of rotation extends in the depth direction of the force measuring apparatus.

The Cartesian axes/directions of the force measuring apparatus are in particular the vertical direction defined by the force measuring tower, the width direction perpendicular to this, which extends horizontally from left to right—or vice versa—for a user standing in front of the force measuring apparatus looking at the force measuring apparatus, and a depth direction which extends perpendicular to the vertical direction and the width direction in the viewing direction of the user looking at the force measuring apparatus.

The fixing element and the counter fixing element are in particular configured—and preferably coordinated with each other—to lock the testing device holder on the slide part. The relative position between the test device holder and the slide part—including the angle about the defined axis of rotation—is optionally clearly fixed.

The position of the test device holder relative to the slide part in the depth direction, and preferably about the two further Cartesian axes, which are perpendicular to each other and to the defined axis of rotation, is preferably fixed by a planar contact of the test device holder on the slide part.

According to a further development of the invention, it is provided that one element selected from the position defining element and the counter position defining element has a locating pin, the other element selected from the counter position defining element and the position defining element having a locating pin receptacle which is configured to receive the locating ping in particular in form-fitting manner Thus, the locating pin engages—especially in a form-fitting manner—in the assembled state, in the locating pin receptacle, and thus defines the position of the test device holder relative to the slide part both in the vertical direction and in the width direction, but allows a rotation about the axis of rotation defined by the longitudinal axis of the locating pin. In this way, the relative position of the test device holder relative to the slide part is at least partially fixed in a very simple manner and with elements that can be manufactured at low cost.

The locating pin receptacle is preferably designed as a bore hole. In particular, the locating pin receptacle is preferably designed as a bore which is complementary to the locating pin in terms of its shape and size, so that it can be received in the bore in a form-fitting manner The position defining element particularly preferably has the locating pin receptacle, which is designed in particular as a bore hole, and the counter position defining element has the locating pin, which can be received in the locating pin receptacle in particular in a form-fitting manner, in particular in the bore hole.

According to a further development of the invention, it is provided that the position defining element is arranged centrally on the test device holder at least along one direction. In this way, the test device holder can be arranged in a particularly stable manner on the slide part, and the angular position of the test device holder relative to the slide part around the axis of rotation can also be defined in a particularly simple and stable manner. For this purpose, the position defining element is particularly preferably arranged centrally, in the width direction, on the test device holder, particularly preferably in a center of gravity or on a center of gravity of the test device holder. In this case, regardless of a momentary angular position of the test device holder about the axis of rotation, no tilting moments act on it, so that the angle of the test device holder about the axis of rotation relative to the slide part can be adjusted without load forces. This allows a highly precise, stable and particularly reproducible adjustment of this angle.

According to a development of the invention, it is provided that a device selected from the first angle adjustment device and the second angle adjustment device has an adjustment tongue, the other device selected from the second angle adjustment device and the first angle adjustment device having a tongue receptacle with two lateral bezels, wherein the adjustment tongue can be arranged and pivoted between the lateral bezels of the tongue receptacle in order to adjust the angle between the test device holder and the slide part about the axis of rotation. This represents a mechanically particularly simple embodiment of the angle adjustment devices, which can be manufactured precisely and at the same time inexpensively, and at the same time allows highly precise adjustment. The lateral bezels are in particular—viewed in the width direction—lateral bezels which laterally delimit the tongue receptacle—in the width direction. In particular, the two lateral bezels form stops for the adjustment tongue in the tongue receptacle. The lateral bezels are particularly preferably designed as shoulders.

The second angle adjustment device of the slide part particularly preferably has the tongue receptacle with the two lateral bezels, the first angle adjustment device of the test device holder having the adjustment tongue which engages in the tongue receptacle in the assembled state.

According to a further development of the invention, it is provided that in or on at least one lateral bezel of the two lateral bezels an—in particular first—adjusting pin is arranged displaceably in the lateral direction, i.e. in the width direction, the adjusting pin engaging in the tongue receptacle in portion, in order to pivot the adjustment tongue when the adjusting pin is displaced in the lateral direction. The adjusting pin can thus, in particular, apply a force to the adjusting tongue in the tongue receptacle and compel it in a direction along the width direction. The adjustment tongue—and also the adjustment receptacle—is/are spaced apart, in particular radially, preferably in the vertical direction, from the position defining element and the counter position defining element, so that a torque about the axis of rotation can be directed into the adjustment tongue by means of the adjusting pin.

In or on the other lateral bezel of the two lateral bezels, a second adjusting pin is preferably arranged. This can also be displaced in the lateral direction, and engages in the tongue receptacle on the other side—opposite in the width direction—in order to pivot the adjustment tongue when the second adjusting pin is displaced in the lateral direction. In this way, by laterally displacing the first adjusting pin and the second adjusting pin, the angle of the testing device holder relative to the slide part can be set and at least pre-fixed, in particular by advantageously clamping the adjusting tongue between the two adjusting pins.

Alternatively, it is possible that a spring element is arranged on the other lateral bezel that does not have the first adjusting pin, the adjustment tongue being able to be adjusted by shifting the first adjusting pin in the lateral direction against the spring force of the spring element. In this way, too, the test device holder can be rotated about the axis of rotation in both orientations, in particular both clockwise and counterclockwise. In one case, the adjusting tongue is displaced by the adjusting pin against the spring element, the spring load of which is thereby increased. In the other case, the spring load of the spring element compels the adjustment tongue against the adjusting pin, so that the adjustment tongue follows it. In this case, it is advantageous that only the actuation of an adjusting pin is required for adjustment.

According to a development of the invention, the at least one adjusting pin is designed as an adjusting screw. The adjusting pin that is designed as an adjusting screw preferably meshes with a thread of the lateral bezel assigned to the adjusting pin. In particular, the adjusting pin preferably passes through a threaded bore formed in the lateral bezel and penetrating the lateral bezel in the lateral direction, in particular in the width direction. The design of the adjusting pin as an adjusting screw represents a particularly simple, inexpensive to manufacture, and easy to use design of an adjusting pin.

According to a development of the invention it is provided that the fixing element is designed as an elongated hole, the counter fixing element being designed as at least one screw hole. The fixing element designed as an elongated hole allows an angular adjustment of the test device holder on the slide part. The screw hole of the counter fixing element is preferably designed as a threaded hole.

In a particularly preferred development, the counter fixing element has two screw holes which are offset from each other, in particular in the width direction. In this way, a particularly stable attachment of the test device holder to the slide element is possible.

By engaging a screw on the one hand in the fixing element designed as an elongated hole and on the other hand in the counter fixing element designed as at least one screw hole, the test device holder can be fixed to the slide part in a particularly simple manner According to a further development of the invention, it is provided that the fastening assembly has a washer with at least one through-hole, the washer being designed to cover the elongated hole on the testing device holder in the assembled state. The through-hole is designed in particular to be penetrated by a screw. The washer preferably has two such through-holes, which in the assembled state are in particular aligned with the two screw holes of the counter fixing element, offset in the width direction so that, in each case, one screw engages through the washer, the elongated hole and the screw hole assigned to it. The washer results in a particularly favorable force distribution when the test device holder is fixed on the slide part. The washer is particularly preferably inserted into a recess in the test device holder so that it does not add thickness when viewed in the depth direction.

According to a further development of the invention, it is provided that the test device holder has a flat surface, the slide part having a counter flat surface, the flat surface and the counter flat surface being designed—and preferably coordinated with each other—in order to lie flush against each other, in particular over the entire surface area thereof, when the test device holder is installed on the slide part. The flat surface and the counter flat surface are preferably aligned in the assembled state in such a manner that the axis of rotation is perpendicular to them, i.e., is oriented parallel to a normal vector of the flat surface and the counter flat surface, wherein the vertical direction on the one hand and the width direction on the other hand preferably lie in a plane that is aligned parallel with the flat surface and the counter flat surface or that coincides with the flat surface and/or the counter flat surface.

Due to the planar, in particular full-surface, contact of the flat surface on the counter flat surface, the translational position of the test device holder relative to the slide part in the depth direction, as well as the angular position of the test device holder relative to the slide part around the two remaining further axes of rotation that are perpendicular to the axis of rotation, can be fixed.

The position defining element and the counter position defining element thus define two directions of translation, the first angle adjustment device and the second angle adjustment device defining a direction of rotation. The flat surface and the counter flat surface also define the third translation direction and the remaining two directions of rotation, so that as a result all degrees of freedom of the test device holder are defined relative to the slide part.

The axis of rotation extends in particular along the depth direction; the two remaining axes of rotation are thus in particular the vertical direction and the width direction.

According to a further development of the invention, it is provided that the slide part is connected in a fixed position to a slide of the force measuring apparatus by means of a plurality of slide locating pins and/or at least one screw connection, preferably a plurality of screw connections, particularly preferably by means of six screw connections. In particular, the slide part is preferably fastened to a base plate of the slide, in particular screwed to the base plate. In this way, the slide part can be configured for retrofitting existing force measuring apparatuses by attaching it to the slide of an existing force measuring apparatus. Thus, already existing force measuring apparatuses can be equipped for a particularly safe, stable and reproducible arrangement of the test device holder.

According to a further development of the invention, it is provided that the test device holder has a test beam to which the at least one test device can be fastened, or is preferably fastened. In particular, three test devices can preferably be fastened, or are fastened, to the test beam.

The test beam preferably extends in the width direction, wherein a plurality of test devices, in particular three test devices, are fastened or can be fastened to the test beam next to each other, offset from each other in the width direction. The test beam is preferably held at a distance from a fastening plate of the test device holder, viewed in the depth direction, or protrudes from the fastening plate in the depth direction. The fastening plate has in particular the position defining element, the first angle adjustment device and the fixing element, or these elements are arranged or formed on the fastening plate.

According to a further development of the invention it is provided that the test beam has at least one retaining hole for fastening the at least one test device. In an equally advantageous and simple manner, the test device can pass through the retaining hole and thereby be fastened to the test beam. The test beam particularly preferably has three such retaining holes for fastening one test device in each case—that is to say, a total of three test devices.

According to a further development of the invention, it is provided that the fastening assembly has a protective cover which can be fastened, preferably is fastened, to the test device holder and can be displaced together with the test device holder on the force measuring tower when the test device holder is fastened to the force measuring tower. The protective cover is designed in particular to overlap the test device or the test devices arranged on the test device holder, wherein it also extends over the sample, in particular when a sample is tested by means of the test device, so that a user is protected in the event of possible damage to the sample and/or the test device. In particular, if the sample bursts, the protective cover prevents splinters of the sample from reaching the user and injuring the user. Since the protective cover is fastened to the test device holder and can be displaced together with it, it can be made comparatively small In particular, there is no need to arrange the complete force measuring apparatus within a large, expensive protective housing that is difficult to operate.

According to a further development of the invention, it is provided that the protective cover can be arranged, preferably is arranged, on the test device holder so as to be displaceable relative to the latter in the vertical direction of the force measuring tower. This represents an effective protection against crushing for the user in the event that an extremity, for example finger, gets between the protective cover and another part of the force measuring apparatus. The protective cover can then be displaced in the vertical direction relative to the test device holder, so that the extremity of the user is not crushed, even if the test device holder is shifted further in the vertical direction toward the extremity. The protective cover can be displaced relative to the test device holder, in particular under a spring load, so that it is held in a stable, defined position relative to the test device holder, as long as no resistance—for example, a user's extremity—prevents the protective cover from being displaced together with the test device holder. The protective cover is particularly preferably held displaceably in guide rails, in particular slide rails, the guide rails, in particular slide rails, being arranged or formed on the test device holder. However, it is also possible that the protective cover itself has such guide rails, in particular slide rails, in which a suitable guide projection, in particular a suitable guide projection of the test device holder, then engages.

According to a further development of the invention, it is provided that the protective cover has a transparent pane or a transparent bezel, in particular made of polycarbonate, in particular Makrolon, in particular made of clear polycarbonate, or as a transparent pane or transparent bezel, in particular made of polycarbonate, in particular Makrolon, in particular clear polycarbonate. In this way, the protective cover can be both stable and transparent, in particular see-through, so that the user can observe the sample through the protective cover during the test.

The object is also achieved by creating a force measuring apparatus which has a fastening assembly according to the invention or a fastening assembly according to any one of the exemplary embodiments described above. The advantages which have already been explained in the context of the force measuring apparatus are particularly achieved with the fastening assembly.

According to a further development of the invention, it is provided that the force measuring apparatus is configured to measure tensile and/or compressive forces on medical hollow bodies. The advantages described above are realized in particular in connection with such a configuration.

The object is also achieved by the creation of a test device holder which has at least one position defining element, an angle adjustment device, and at least one fixing element, the test device holder being configured for use as a test device holder of a fastening assembly according to the invention or a fastening assembly according to any one of the previously described embodiments. The advantages that have already been described above in connection with the fastening assembly are realized in particular in connection with the test device holder. In particular, the test device holder has at least one feature, preferably a combination of features, which were previously explained in connection with the test device holder of the fastening assembly according to the invention or an exemplary embodiment of the fastening assembly.

The object is finally also achieved by creating a slide part which has at least one counter position defining element, an angle adjustment device and at least one counter fixing element, the slide part being designed for use as a slide part of a fastening assembly according to the invention or a fastening assembly according to any one of the previously described embodiments. The advantages which have already been explained in the context of the fastening assembly are particularly achieved with the slide part. The slide part preferably has at least one feature, preferably a combination of features, which was previously described in connection with the slide part of the fastening assembly according to the invention or one of the previously described exemplary embodiments of the fastening assembly.

The invention is explained in greater detail below with reference to the drawing. In the drawings.

Figure 1:
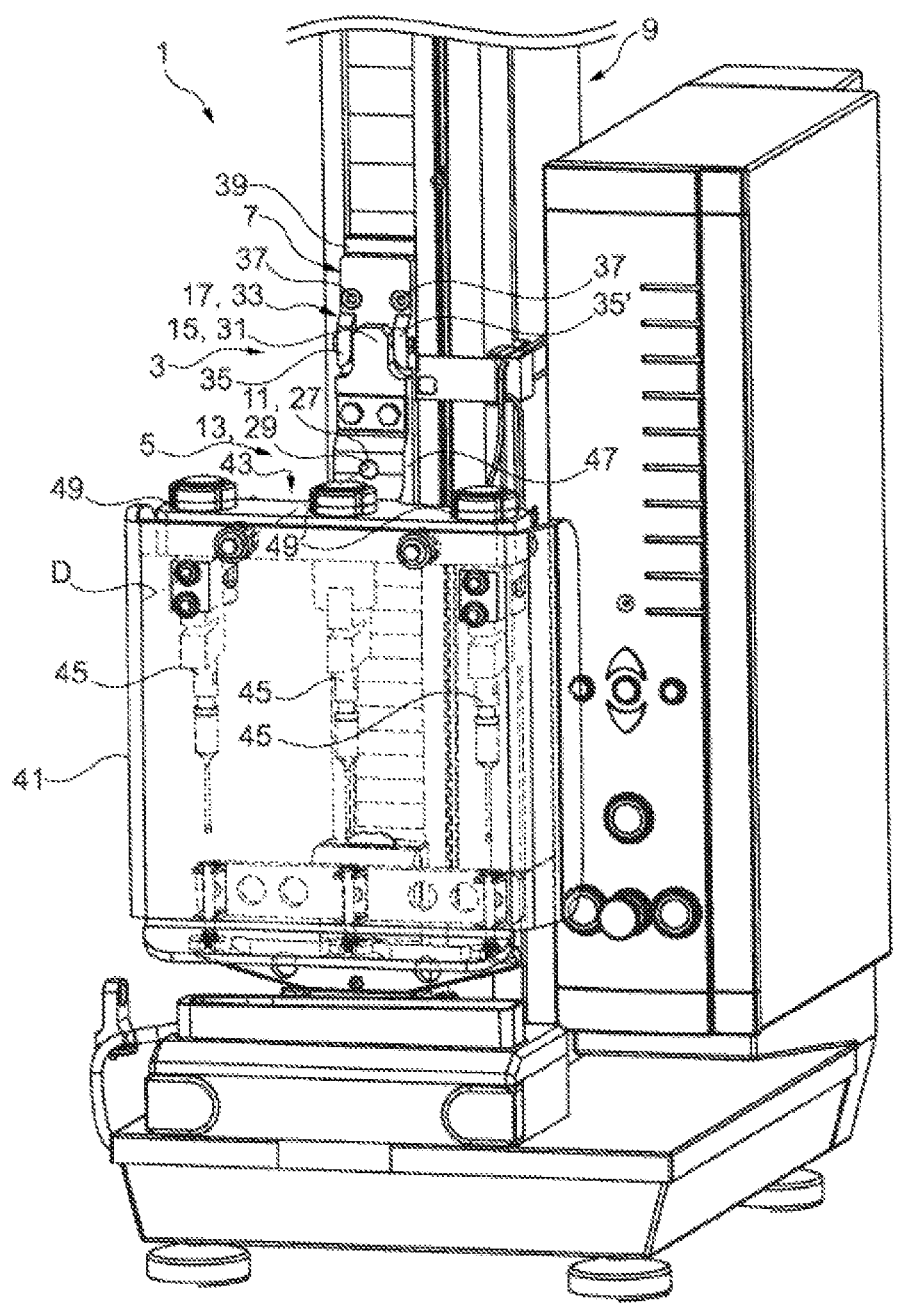
FIG. 1 is a representation of an embodiment of a force measuring apparatus having a test device holder, a fastening assembly for fastening the test device holder, and a slide part.

FIG. 1 shows an illustration of an embodiment of a force measuring apparatus 1 which has a fastening assembly 3 for fastening a test device holder 5 to the force measuring apparatus 1. The fastening assembly 3 has a slide part 7 which is arranged on a force measuring tower 9 of the force measuring apparatus 1 so as to be displaceable in the vertical direction of the force measuring tower 9—in FIG. 1 in the vertical direction. The test device holder 5 has at least one position defining element 11, and the slide part 7 has at least one counter position defining element 13. The position defining element 11 and the counter position defining element 13 are configured to determine a position of the test device holder 5 relative to the slide part 7 in at least one direction selected from a vertical direction of the force measuring tower 9, i.e., the vertical direction in FIG. 1, and a direction perpendicular to the vertical direction, and at the same time to allow a rotation of the test device holder 5 relative to the slide part 7 about an axis of rotation D defined by the position defining element 11 and/or the counter position defining element 13. In the embodiment shown here, the position defining element 11 and the counter position defining element 13 cooperate in such a way that the position of the test device holder 5 relative to the slide part 7 is determined along two directions, namely in the vertical direction and in the width direction, wherein the width direction in FIG. 1, as a result of the perspective view, deviates slightly from the horizontal, from slightly above left to slightly below right. The axis of rotation D, which is defined by the position defining element 11 on the one hand and the counter position defining element 13 on the other hand, is inclined in this case on the image plane—due to the slightly inclined view- and in particular is perpendicular a plane that is established on the one hand by the width direction and on the other hand by the vertical direction. The axis of rotation D thus extends in particular in the depth direction of the force measuring apparatus 1.

The test device holder 5 also has a first angle adjustment device 15, the slide part 7 having a second angle adjustment device 17. The angle adjustment devices 15, 17 are configured and in particular coordinated with each other in order to adjust and preferably fix an angle of the test device holder 5 relative to the slide part 7 about the axis of rotation D.

The test device holder 5 also has at least one fixing element 19, the slide part 7 having at least one counter fixing element 21. The fixing element 19 and the counter fixing element 21 are configured and in particular coordinated with each other in order to fix the test device holder 5 on the slide part 7. The fixing element 19 and the counter fixing element 21 are shown and explained in more detail in FIG. 3. They are designed in particular to lock the test device holder 5 on the slide part 7, and preferably to clearly define the position of the test device holder 5 on the slide part 7, in particular the angle of rotation about the axis of rotation D.

By means of the position defining element 11 and the counter position defining element 13, it is possible to fix the test device holder 5 on the slide part 7 and relative to the slide part 7 in a linear direction, wherein an angular orientation of the test device holder 5 relative to the slide part 7, and thus at the same time relative to the vertical direction of the force measuring tower 9, is subsequently possible by rotating the test device holder 5 about the axis of rotation D. The angle adjustment devices 15, 17 are advantageously used for this purpose, and can particularly preferably be used at the same time to set the angle. Finally, the position of the test device holder 5 on the slide part 7 can be fixed by means of the fixing element 19 and the counter fixing element 21, so that it remains unchangeable even when the force measuring apparatus 1 is used. With the aid of the fastening assembly 3 proposed here, it is thus possible to align and fix the test device holder 5 securely, stably and reproducibly on the force measuring apparatus 1.

Figure 3:
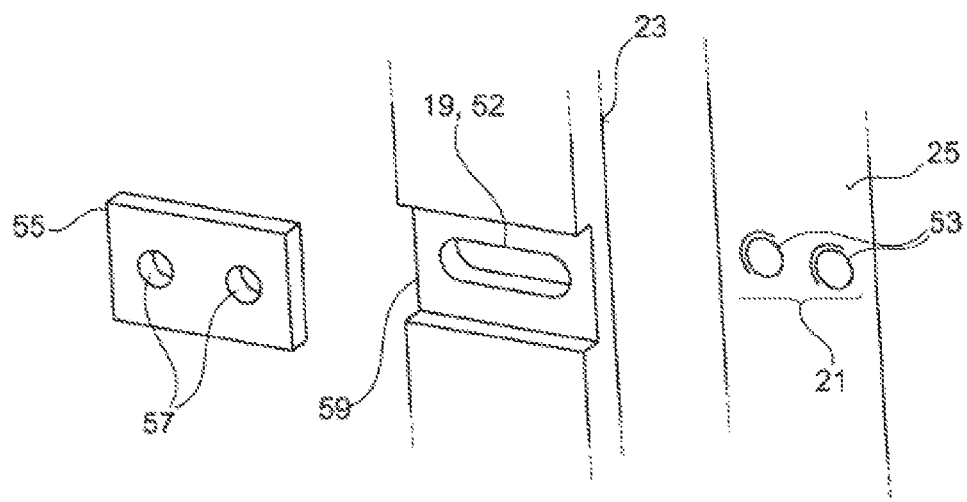
FIG. 3 is a detailed representation of the embodiment of the force measuring apparatus according to FIG. 1.

A third direction of translation in the depth direction of the force measuring apparatus 1, as well as two further directions of rotation about two axes of rotation that are perpendicular to each other and perpendicular to the axis of rotation D, are implemented by a planar contact of the test device holder 5 on the slide part 7—in particular, of a flat surface 23 of the test device holder 5 shown in FIG. 3 on a counter flat surface 25 of the slide part 7. In this case, the flat surface 23 and the counter flat surface 25 lie flush, in particular over their entire surface area, against each other. In this way, the orientation of the test device holder 5 relative to the slide part 7 can be completely fixed, with all degrees of freedom being constrained.

In the exemplary embodiment shown here, the position defining element 11 has a locating pin receptacle 27, in particular in the form of a bore hole. The counter position defining element 13 can preferably be received in a form-fitting manner in the locating pin receptacle 27, the counter position defining element 13 being designed in this case as a locating pin 29. The locating pin 29 and the locating pin receptacle 27 are complementary to each other in such a way that the locating pin 29 can be arranged in the locating pin receptacle 27 with a form fit.

The position defining element 11 is arranged in this case centrally on the test device holder 5, at least in the width direction. The position defining element 11, in this case the locating pin receptacle 27, is particularly preferably arranged in a center of gravity or on a center of gravity of the testing device holder 5. In this way, a torque-free mounting of the test device holder 5 on the slide part 7 can be achieved by means of the position defining element 11, making it possible to adjust the angle about the axis of rotation D by means of the angle adjustment device 15, 17 without any load forces. In particular, no tilting moments caused by gravity act on the test device holder 5 when the latter is arranged on the slide part 7 by means of the position defining element 11.

The first angle adjustment device 15 in this case has an adjustment tongue 31, the second angle adjustment device 17 having a tongue receptacle 33 with two lateral bezels 35, 35', the adjustment tongue 31 being arranged and pivotable in the tongue receptacle 33 between the lateral bezels 35, 35' in order to adjust the angle between the test device holder 5 and the slide part 7. The lateral bezels 35, 35' in particular form stops, in particular in the form of shoulders, for the adjustment tongue 31.

The slide part 7 is preferably connected in a fixed position to a slide 39 of the force measuring apparatus 1 by slide locating pins and/or at least one screw connection, in this case in particular by six screws 37, only two of which are visible in FIG. 1. In particular, the slide part 7 is preferably screwed onto a base plate of the slide 39.

The fastening assembly 3 also has a protective cover 41 which is fastened to the test device holder 5 and can be displaced together with the test device holder 5 on the force measuring tower 1. The protective cover 41 serves in particular to protect an operator of the force measuring apparatus 1 during a force measurement—in particular, as a splinter or burst protection. The protective cover 41 is preferably arranged so that it can be displaced relative to the test device holder 5 in the vertical direction of the force measuring tower 1—in particular under spring load. In particular, it is preferably guided displaceably on the test device holder 5 in guide rails, preferably slide rails. In this way, the protective cover 41 can yield if it comes into contact with an extremity of an operator, in particular with a finger or a hand, even if the test device holder 5 continues to move toward the extremity. This accordingly effectively prevents the extremity from being trapped, and thus prevents injury to the operator.

The protective cover 41 is preferably designed as a transparent pane or as a transparent bezel, particularly preferably comprising polycarbonate, in particular Makrolon, in particular crystal-clear polycarbonate, or consisting of polycarbonate, in particular Makrolon, in particular of crystal-clear polycarbonate.

The test device holder 5 has a test beam 43 to which at least one test device 45, in this case three test devices 45, are attached. The test beam 43 protrudes from a fastening plate 47 in the depth direction of the force measuring apparatus 1, and it extends in the width direction of the force measuring apparatus 1.

In particular, the test beam 43 has at least one retaining hole 49, in this case three retaining holes 49, for fastening the test devices 45.

Figure 2:
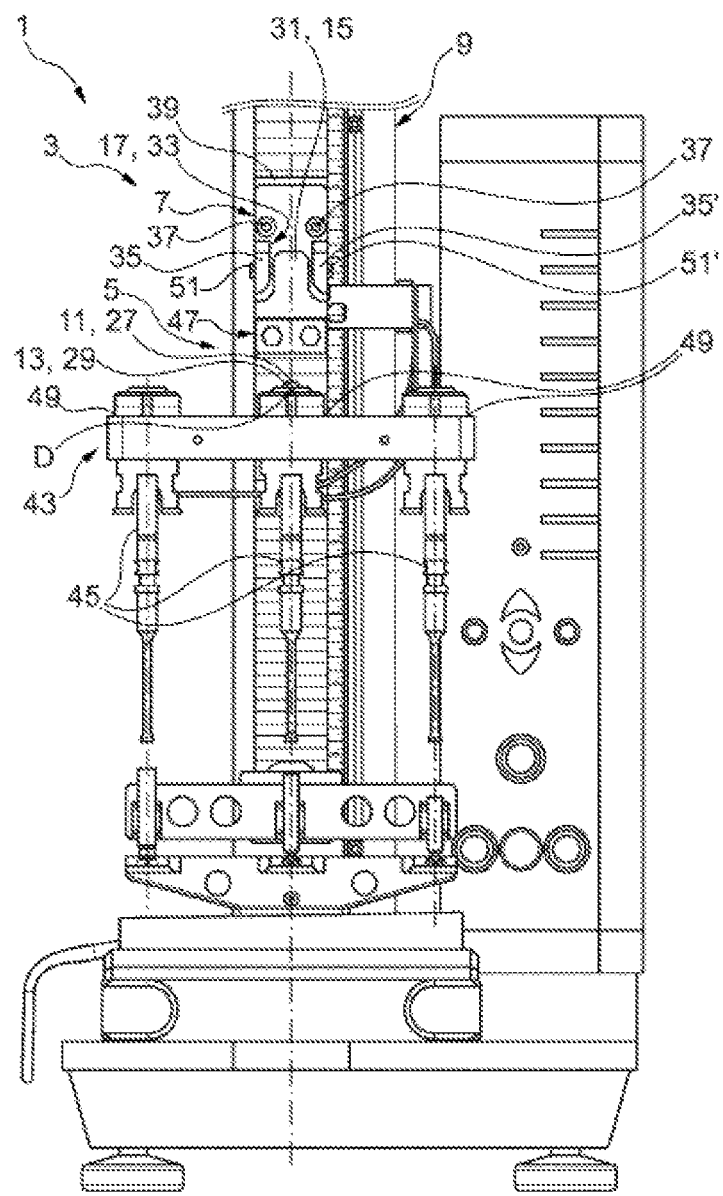
FIG. 2 is an end view of the embodiment of the force measuring apparatus according to FIG. 1.

FIG. 2 shows an end view of the force measuring apparatus 1 according to FIG. 1 without the protective cover 41. Identical and functionally identical elements are provided with the same reference symbols, so that in this respect reference is made to the preceding description.

In each of the lateral bezels 35, 35', an adjusting pin 51, 51' is arranged displaceably in the lateral direction, that is to say in the width direction—that is, in FIG. 2, in the horizontal direction. Each of the adjusting pins 51, 51' engages in a tongue receptacle 33 in order to pivot the adjustment tongue 31 when the adjusting pins 51, 51' are displaced in the lateral direction. The adjusting pins 51, 51' are preferably designed as adjusting screws which each have an external thread which meshes with the corresponding internal thread of the assigned lateral bezel 35, 35'.

As an alternative, however, it is also possible that only one of the lateral bezels 35, 35' has an adjusting pin 51, 51', while the other lateral bezel 35', 35 of the lateral bezels 35, 35' has a spring element, which accordingly supports, on a side opposite the adjusting pin 51, 51', the adjustment tongue 31 and allows displacement against a spring load of the spring element by screwing in the adjusting pin 51, 51', while, due to its spring load, it causes the adjusting tongue 31 to be displaced together with the adjusting pin 51, 51'—i.e., to follow it—when the adjusting pin 51, 51' is unscrewed further out of the tongue receptacle 33. This configuration is ultimately easier to operate than the configuration shown in FIG. 2, since only one adjusting pin has to be actuated with a screw, while the exemplary embodiment according to FIG. 2 always requires the actuation of both adjusting pins 51, 51'. However, the embodiment according to FIG. 2 allows a more stable, in particular significantly less vibration-prone fixation of the test device holder 5, since the adjustment tongue 31 can be securely, firmly and stably clamped between the two adjusting pins 51, 51' in the predetermined angular position.

FIG. 3 shows a schematic exploded view of a detail of the test device holder 5 on the one hand and of the slide part 7 on the other hand.

It becomes clear in this case that the fixing element 19 is designed as an elongated hole, the counter fixing element 21 being designed as at least one screw hole 53, in this case in particular as two screw holes 53. The screw holes 53 are designed in particular as threaded bores.

In particular, the screw holes 53 are offset relative to each other in the width direction of the force measuring apparatus 1.

The fastening assembly 3 also has a washer 55 which has at least one through-hole 57, in this case two through-holes 57. The through-holes 57 are matched to the screw holes 53 with regard to their size and with regard to their distance from each other, such that they are aligned with the screw holes 53 in the assembled state.

The washer 55 is designed to cover the elongated hole 52 in the assembled state. In this case, the test device holder 5 preferably has a recess 59 into which the washer 55 can be inserted—in particular on the fastening plate 47. The test device holder 5 is then preferably fixed to the slide part 7 by means of two fastening screws (not shown), the fastening screws extending through the through-holes 57 of the washer 55 and the elongated hole 52, and finally into the screw holes 53, where they are screwed in. The washer 55 allows an improved force distribution of the fixing forces.

The elongated hole 52 on the one hand and the recess 59 as well as the washer 55 on the other hand are preferably dimensioned in such a way that an adjustment of the test device holder 5 on the slide part 7 is possible, in particular with regard to the angular position about the axis of rotation D, even if the fastening screws are already loosely screwed into the screw holes 53. In particular, the recess 59 is somewhat larger than is necessary to accommodate the washer 55, the elongated hole also preferably being larger, as it corresponds on the one hand to the diameter and on the other hand to the largest width spacing of the fastening screws.

If the test device holder 5 is adjusted on the slide part 7, in particular with regard to the angle about the axis of rotation, it can be fixed securely and stably on the slide part 7 by tightening the fastening screws in the screw holes 53.

Overall, with the fastening assembly 3, the force measuring apparatus 1, the test device holder 5 and the slide part 7 proposed here, a possibility is created to align and fix the test device holder 5 securely, stably and reproducibly on the force measuring apparatus 1.

The invention claimed is:

1. A fastening assembly (3) for fastening a test device holder (5) to a force measuring apparatus (1), having
   a test device holder (5), and
   a slide part (7) which can be arranged or is arranged on a force measuring tower (9) of a force measuring apparatus (1) in such a way that it can be displaced in the vertical direction of the force measuring tower (9), wherein
   the test device holder (5) has at least one position defining element (11), and the slide part (7) has at least one counter position defining element (13), wherein
   the position defining element (11) and the counter position defining element (13) are configured to fix the position of the test device holder (5) relative to the slide part (7) in at least one direction that is selected from a vertical direction of the force measuring tower (9) and a direction perpendicular to the vertical direction, and at the same time to allow a rotation of the test device holder (5) relative to the slide part (7) about an axis of rotation (D) defined by the position defining element (11) and/or the counter position defining element (13), wherein
   the test device holder (5) has a first angle adjustment device (15) and the slide part (7) has a second angle adjustment device (17), which are configured to adjust and preferably to fix an angle of the test device holder (5) relative to the slide part (7) about the axis of rotation (D), and wherein
   the test device holder (5) has at least one fixing element (19) and the slide part (7) has at least one counter fixing element (21), wherein
   the fixing element (19) and the counter fixing element (21) are configured to fix the test device holder (5) on the slide part (7), wherein a device selected from the first angle adjustment device (15) and the second angle adjustment device (17) comprises an adjustment tongue (31), the other device selected from the second angle adjustment device (17) and the first angle adjustment device (15) comprises a tongue receptacle (33) with two lateral bezels (35, 35'), wherein the adjustment tongue (31) is arranged and pivotable between the lateral bezels (35, 35') by the angle of test device holder (5) relative to the slide part (7) about the axis of rotation (D).

2. The fastening assembly (3) according to claim 1, characterized in that one element selected from the position defining element (11) and the counter position defining element (13) has a locating pin (29), and the other element selected from the counter position defining element (13) and the position defining element (11) has a locating pin receptacle (27), the locating pin receptacle (27) being configured to receive the locating pin (29).

3. The fastening assembly (3) according to claim 1, characterized in that the position defining element (11) is arranged at least in one direction centrally on the test device holder (5).

4. The fastening assembly (3) according to claim 1, characterized in that an adjusting pin (51, 51') is arranged in or on at least one lateral bezel (35, 35') of the lateral bezels (35, 35') in a manner allowing displacement in a lateral direction, which adjusting pin engages in the tongue receptacle (33) in order to pivot the adjusting tongue (31) when the adjusting pin (51, 51') is displaced in the lateral direction.

5. The fastening assembly (3) according to claim 4, characterized in that the adjusting pin (51, 51') is designed as an adjusting screw which preferably meshes with a thread of the lateral bezel (35, 35') assigned to the adjusting pin (51, 51').

6. The fastening assembly (3) according to claim 1, characterized in that the fixing element (19) is designed as an elongated hole (52), the counter fixing element (21) being designed as at least one screw hole (53).

7. The fastening assembly (3) according to claim 1, characterized in that the counter fixing element (21) has two screw holes (53).

8. The fastening assembly (3) according to claim 1, characterized in that the fastening assembly (3) has a washer (55) with at least one through-hole (57), the washer (55) being designed to cover the elongated hole (52) on the test device holder (5) once assembled.

9. The fastening assembly (3) according to claim 1, characterized in that the test device holder (5) has a flat surface (23), the slide part (7) having a complementary flat surface (25), the flat surface (23) and the complementary flat surface (25) being designed to lie flat against each other in the assembled state of the test device holder (5) on the slide part (7).

10. The fastening assembly (3) according to claim 1, characterized in that the slide part (7) is connected and fixed in location
a) by slide locating pins, and/or
b) by at least one screw connection
to a slide (39) of the force measuring apparatus (1).

11. The fastening assembly (3) according to claim 1, characterized in that the test device holder (5) has a test beam (43) to which at least one test device (45) can be attached or is attached.

12. The fastening assembly (3) according to claim 11, characterized in that the test beam (43) has at least one retaining hole (49) for fastening the at least one test device (45).

13. The fastening assembly (3) according to claim 1, characterized in that the fastening assembly (3) has a protective cover (41) which can be fastened to the test device holder (5) and can be moved together with the test device holder (5) on the force measuring tower (9).

14. The fastening assembly (3) according to claim 13, characterized in that the protective cover (41) can be arranged on the test device holder (5) so as to be displaceable relative to the test device holder (5) in the vertical direction of the force measuring tower (9).

15. The fastening assembly (3) according to claim 13, characterized in that the protective cover has a transparent pane or a transparent bezel, in particular made of polycarbonate, or is designed as a transparent pane or transparent bezel, in particular made of polycarbonate.

* * * * *